United States Patent [19]

Molzahn et al.

[11] 4,206,582
[45] Jun. 10, 1980

[54] HEADER LIFT ARRANGEMENT FOR WINDROWERS

[75] Inventors: Herbert W. Molzahn, Hamilton; Ronald Stowell, Oakville, both of Canada

[73] Assignee: International Harvester Company, Chicago, Ill.

[21] Appl. No.: 11,351

[22] Filed: Feb. 12, 1979

[51] Int. Cl.[2] ............................................ A01D 67/00
[52] U.S. Cl. ...................................... 56/15.8; 56/208; 56/DIG. 1
[58] Field of Search ............... 56/15.8, DIG. 1, 15.7, 56/15.9, 17.1, 17.2, 208, 209

[56] References Cited

U.S. PATENT DOCUMENTS

| Re. 30,056 | 7/1979 | Halls | 56/15.8 |
|---|---|---|---|
| 3,474,607 | 10/1969 | Fairbank et al. | 56/209 |
| 3,479,805 | 11/1969 | Soteropulos | 56/DIG. 1 |
| 3,589,115 | 6/1971 | Taylor et al. | 56/208 |
| 3,672,135 | 6/1972 | Peacock et al. | 56/DIG. 1 |
| 3,699,754 | 10/1972 | Koch et al. | 56/15.8 |
| 3,995,411 | 12/1976 | Johnson | 56/15.8 |

Primary Examiner—Louis G. Mancene
Assistant Examiner—Paul J. Hirsch
Attorney, Agent, or Firm—Dennis K. Sullivan; Neal C. Johnson; F. David AuBuchon

[57] ABSTRACT

A self-propelled windrower having a crop cutting header mounted forwardly thereof by a pair of laterally spaced lower suspension links and an upper centrally located stabilizing link, is provided with lifting linkages including upper lift arms mounted on the frame and lifting links interconnecting the lift arms and the lower suspension links wherein the upper lift arms are actuated by hydraulic cylinders connected hydraulically in a master-slave relationship, the rod end of the cylinders being connected to the lift arms through axially acting lost motion connections. Stops are provided to limit the upward motion of the lift arms at the transport position thereby rendering the lost motion connections ineffective.

2 Claims, 3 Drawing Figures

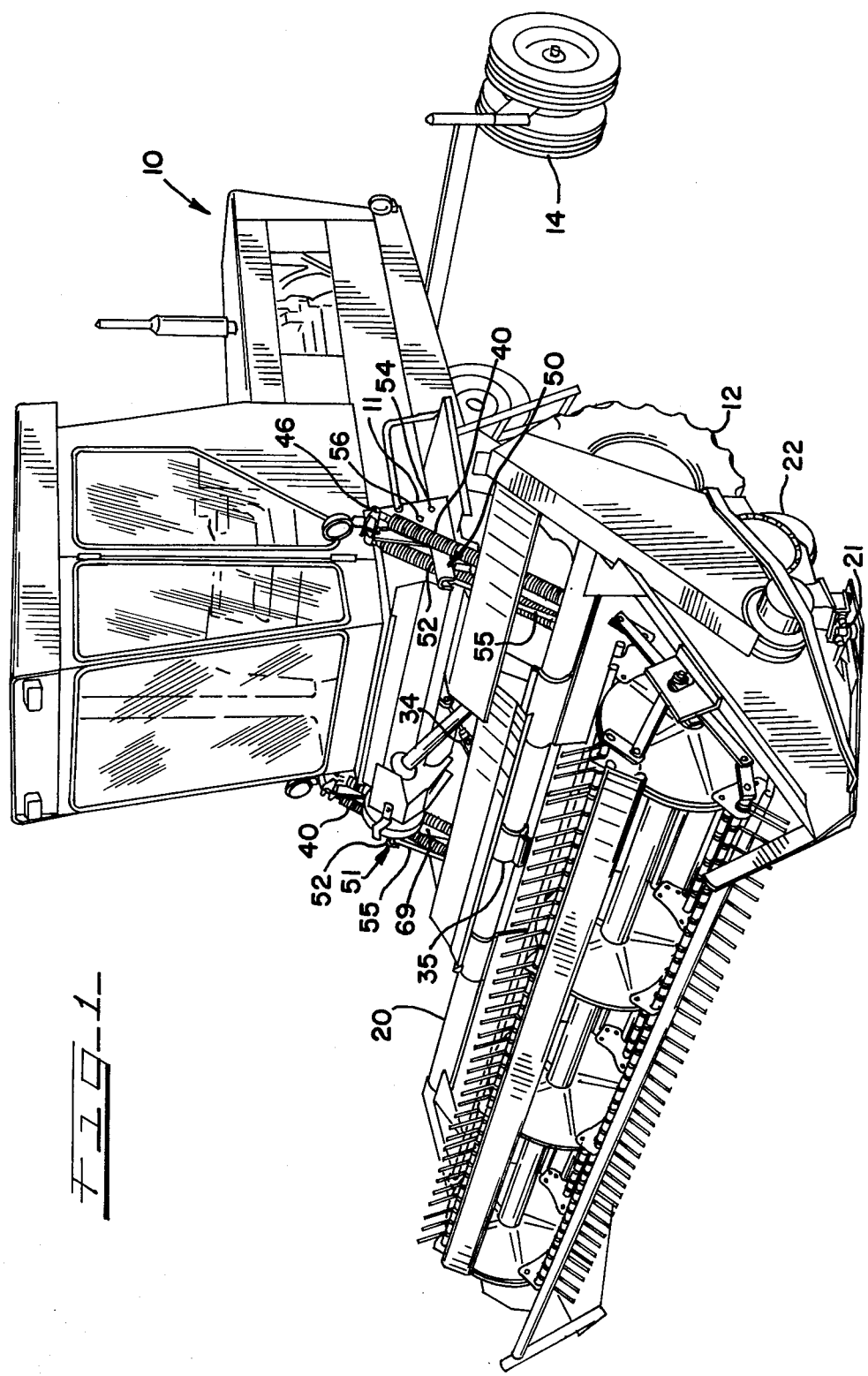

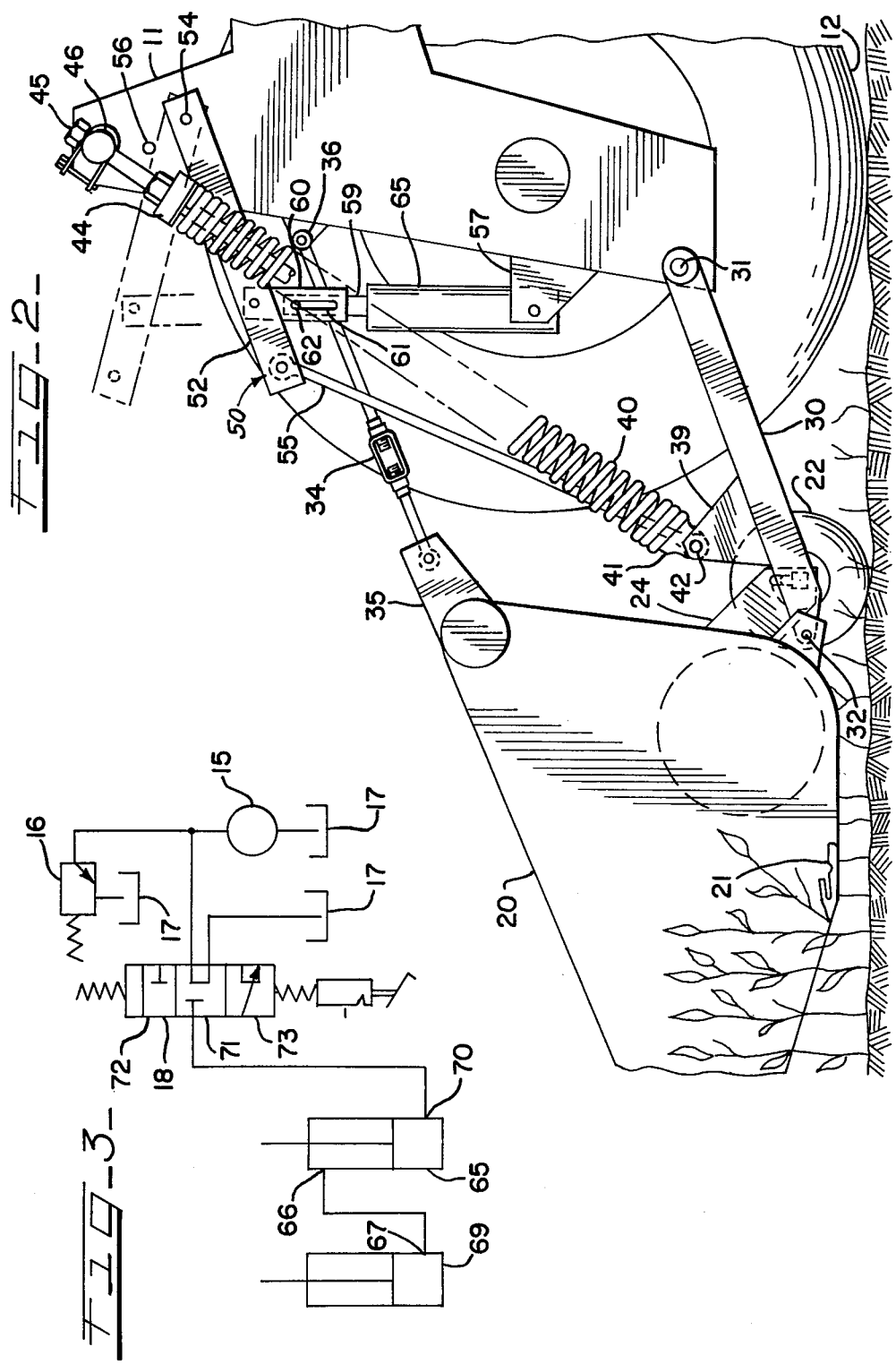

HEADER LIFT ARRANGEMENT FOR WINDROWERS

This invention relates to windrowers of the type having a laterally elongated crop harvesting header disposed forwardly of a mobile, generally self-propelled, frame and more particularly, to a header suspension and lifting arrangement therefor which provides certain advantages in positioning and control of the header during operation with the header either on the ground or raised a specific level above the ground, as in harvesting cereal crops, or with the header raised to a transport position.

When conventional windrowers are operated with the crop harvesting header on its ground shoes, as in harvesting hay, it is considered desirable for the header to possess the characteristic of radial or lateral flotation, that is, one end of the header can move up and down relatively independently of the other end, so that the cutting apparatus can be maintained in close spacing to the ground even if the field is not level. To make the movement of the header more responsive to the changing contours of the ground and reduce friction loading, it is also desirable to have a majority of the weight of the header counterbalanced by flotation springs. Various arrangements for accomplishing the above may be found in U.S. Pat. No. 3,469,381, No. 3,474,607, and No. 3,589,115.

When the windrower is to be operated to cut crops at a certain distance above the ground level, as in cereal grain harvesting, the radial flotation is undesirable. Radial flotation, as taught above, would make it nearly impossible to maintain the header in a level position, that is, parallel to the wheel axis of the mobile frame, which becomes the ground reference when the header is off the ground. One means of eliminating this is by using a masterslave lift cylinder hydraulic system, such as that taught in U.S. Pat. No. 3,603,066, to hydraulically tie the movement of one end of the header to the movement of the other end. At the same time, however, it would be desirable for the header to override obstacles such as embankments, which it might encounter in the raised operating position. On the other hand, it would be desirable for the floatation springs to become less active in this position to reduce the tendency of the header to bounce during operation.

When a header with radial float is raised to the transport position, one end of the header usually raises first and then the other due to the unequal weight distribution caused by the location of drives on one side. This has been found to be objectionable to those operating the equipment. Thus it is desirable to be able to raise both sides of the header evenly. It is also desirable that when the header is in the fully raised or transport position, there be no means by which the header may bounce relative to the frame. Although the above-mentioned references teach structures which may provide some of the desirable characteristics mentioned herein, none of them will provide all of these characteristics in each of the various modes of operation.

SUMMARY OF THE INVENTION

Accordingly, it is the primary object of the invention described and claimed herein to provide a header suspension and lift system for a windrower which provides some or all of the following characteristics: unrestricted radial float when cutting at ground level with active flotation springs; header carried level when cutting above ground level; header free to override obstacles encountered when cutting above ground level; header raises level to the transport position; and in the transport position, the header cannot bounce.

This and other objects and advantages are specifically met in a self-propelled windrower having a mobile frame and a crop cutting header mounted forwardly thereof by a pair of laterally spaced lower suspension links and an upper centrally located stabilizing link, flotation springs interconnecting the lower links and the mobile frame. A lifting linkage is provided for each lower suspension link, the linkage including an upper lift arm pivotally mounted for vertical swinging on the frame and a lifting link interconnecting the lift arm and the lower suspension link. The upper lift arm is actuated by a hydraulic cylinder connected to the frame, the rod end of the cylinder being connected to the lift arm through an axially acting lost motion connection. A stop is provided to limit the upward motion of the lift arm at the transport position thereby rendering the lost motion connection ineffective. The respective hydraulic cylinders for the lifting linkages are connected in a master-slave relationship, the master cylinder being connected for selective actuation to the windrower hydraulic system.

DETAIL DESCRIPTION OF THE DRAWINGS

Other objects and advantages of the invention will be apparent upon reading the detailed description thereof and upon reference to the drawings in which:

FIG. 1 is a perspective view of a windrower having a crop harvesting header disposed thereon in accordance with the invention;

FIG. 2 is a schematic side view illustrating the header suspension and lifting linkages of the windrower of FIG. 1; and FIG. 3 is a schematic diagram of the portion of the hydraulic system of the windrower of FIG. 1 relating the actuation of the header lifting linkages.

DESCRIPTION OF THE PREFERRED EMBODIMENT

Referring to FIG. 1, there is shown a self-propelled windrower generally designated 10 of the type more specifically described in U.S. Pat. No. 4,009,556 which includes a wheel-supported mobile frame 11 supported by a pair of forward main driving wheels 12 driven in any suitable manner and rear caster wheels 14. There is further provided on the mobile frame, in accordance with the art and illustrated schematically in FIG. 3, a hydraulic pump 15, a pressure relief valve 16, a reservoir 17, and a pedal operated control valve 18 to be more specifically described hereinafter.

Disposed forwardly of the mobile frame 11 is a laterally elongated crop harvesting header 20 of the conventional type having a crop cutting sickle bar 21 disposed across the forward edge thereof, the sickle bar being driven in any suitable manner. The header 20 is further provided with a ground engaging means which gauges the height of the sickle bar from the ground, the ground engaging means herein being in the form of wheels 22 rotatably mounted for vertical adjustment to brackets 24 attached to the rear of the header 20 adjacent the laterally outer ends thereof.

The header 20 is mounted to the mobile frame 11 by left and right lower suspension links 30 (one being shown in FIG. 2) which have their rear ends pivotally mounted as at 31 to the mobile frame 11 and their forward ends pivotally mounted to the header 20 as at 32. The header is further controlled by an upper stabilizing link means which may be two upper links but preferably comprises a single upper stabilizing link 34 pivotally connected on one end to a bracket 35 mounted on the upper rear portion of the header 20 near its transverse center and extending nearly parallel to the lower links 30 to its rear end 36 pivotally attached to the mobile frame. It will be appreciated that the pivotal connections provide a small amount of pivoting normal to the pin axis as by being spherical joints and thus permit one end of the header to be lifted a significant amount without the other end being lifted. Thus, the header 20 as thus far described, is mounted to the mobile frame 11 in a manner providing radial flotation therebetween. The lower suspension links 30 are further provided intermediate their ends with a bracket 39 to which one or more flotation springs 40 may be attached in any suitable manner such as a spring plug 41 attached to a transverse pin 42. The upper end of the flotation springs 40 are attached to spring plugs 44 threaded on tensioning bolts 45 which are attached to the frame 11 by an upper retainer 46. The tensioning bolts are tightened such that when the windrower 10 is on level ground and the header 20 is on its gauging wheels 22. Most of the weight of the header, but not all of it, is supported by the springs.

A pair of left and right laterally spaced lifting linkages 50 and 51 operate in conjunction with their respective lower suspension links 30 to raise and lower the crop harvesting header 20 between an operating position with the gauge wheels 22 on the ground, an operating position with the cutting apparatus and gauge wheels spaced a given amount above the ground, as for harvesting the top parts only of cereal crops, and a transport position with the header 20 fully raised. Since the lifting linkages 50, 51 are identical except for the hydraulic cylinders thereof, only the left lifting linkage 50 will be described. As will be seen in FIG. 2, the left linkage 50 comprises an upper lift arm 52 which is pivotally attached to the frame 11 as at 54 for vertical swinging movement and extends generally forwardly to a distal end whereat a lift link 55 of fixed length is pivotally connected, the upper end of the lift link extending downwardly to a pivotal connection with the bracket 39 as by the pin 42 on the lower suspension link 30. A stop means in the form of a transverse pin 56 attached to the frame 11 limits the upward movement of the upper lift arm 52 and defines the maximum upward travel or the transport position of the header 20. It will be seen that since the lift links 55 are of fixed length and pivotally connected respectively to the lower suspension link in the upper lift arm, when the upper lift arm contacts the stop means 56, no further upward travel of the header 20 is possible.

A hydraulic cylinder 65 has its head end pivotally attached to a bracket 57 forming part of the mobile frame 11. The rod end 59 of the hydraulic cylinder 65 is telescoped within an internally cylindrical adapter 60 pivotally attached to the upper lift arm 52 intermediate its ends. The cylindrical adapter 60 has an axial slot 61 in which a pin 62 inserted in the end of a cylinder rod 59 rides thereby providing an axial lost motion compression connection between the cylinder rod 59 and the upper lift arm 52 while preventing the rod separating from the adapter 60. A similar hydraulic cylinder 69 is connected in the right lifting linkage 51 in the same manner.

Viewing the hydraulic cylinders 65, 69 of the lifting linkages 50, 51 in greater detail, and referring primarily to FIG. 3, which is a schematic diagram of only that portion of the windrower hydraulic system dealing with the header lifting linkage, it will be seen that the hydraulic cylinder 65 used in the left lifting linkage 50 is a master cylinder, preferably of the rephasing type described in U.S. Pat. No. Re. 28,695, having an outlet port 66 connected to the inlet port 67 of the slave cylinder 69 in the right lifting linkage 51. The capacity of the master cylinder 65 is matched to that of the slave cylinder 69 in such a way that for a given amount of travel of the piston in the master cylinder, the piston of the slave cylinder will travel exactly the same amount and vice versa. The inlet port 70 of the master cylinder 65 is hydraulically connected through the pedal actuated control valve 18 to the hydraulic pump 15 of the windrower 10. The control valve 18 provides three conditions of operation including the normal spring biased center "hold" position 71 bypassing the hydraulic pump 15 to the reservoir 17 and hydraulically locking the master cylinder 65, and thus the slave cylinder 69 as well, a manually held "raise" position 72 interconnecting the hydraulic pump 15 and the master cylinder 65, and a detented "drop" position 73 interconnecting the master cylinder 65 with the reservoir 17.

In operation, when the control valve 18 is moved to the "drop" position 73, the master cylinder 65 is connected with the reservoir and both cylinders 65, 69 collapse until the header 20 is resting on its ground wheels 22 and most of the header weight is supported by the flotation springs 40. Since the valve 18 is held in the "drop" position 73 by the detent, as the header floats up and down while following the contour of the ground, fluid can flow into and out of the master cylinder 65 as necessary to allow the piston to move freely. Although the slave cylinder 69 will generally follow the movement of the master cylinder, the lost motion connections between the rod ends 59 of the cylinders 65, 69 and the adapters 60 in the left and right lifting linkages 50, 51 provide for independent movement of the transverse ends of the header 20 in response to the ground contour or radial flotation.

When the control valve 18 is placed in the raised position 72, the master cylinder 65 is connected to the pump 15. Once the lost motion in the adapter 60 is taken up, it will be apparent that because the master and slave cylinders are matched, both ends of the header 20 will be raised an equal amount at an equal rate and, assuming the header is properly adjusted, will be level relative to the frame 11. When the control valve 18 is now placed in the hold position 71 for cutting at a given level above the ground, as in cereal crops, the master cylinder 65 and thus the slave cylinder 69 are hydraulically locked in position and accordingly, the header 20 must remain level compared to the mobile frame 11. However, if either end of the header should ride up on an obstacle, such as an embankment, the resulting upward motion of the upper lift arm 52 caused by the header acting through the links 30 and 55 is accommodated by the sliding of the adapters 60 on the cylinder rod 69. Once the obstacle is passed, the header 20 will return to the original cutting height and will be held there by the hydraulic cylinders 65, 69. It will be further appreciated that when the header is positioned for cutting above ground level, the effect of the flotation springs 40 will be considerably reduced but not eliminated. Thus, the header will not be as likely to bounce in normal cutting operations in this position.

When the control valve 18 is moved again to the raise position 72, the header 20 will continue to be lifted evenly until the upper lift arms 52 contact the stop 56 in the frame 11, leaving the header in transport position. The stops 56 prevent the lost motion connections at the adaptors 60 from opening and thus, the header is prevented from bouncing during field or road transport.

Thus, it is submitted that there has been described, in accordance with the invention, a header lift and floating arrangement which fully meets the objects and advantages described above. It is recognized that others will be able to make minor changes in view of the above teachings. For example, although the lift links 55 are of fixed length, they could be adjustable between various fixed lengths without departing from the invention. Accordingly, it intended to embrace all such minor changes as fall within the scope of the following claims.

What is claimed is:

1. A windrower comprising:
   a mobile main frame, said main frame including a source of hydraulic power and control valve means therefor;
   a laterally elongated crop cutting header disposed forwardly of said main frame, said header including a crop cutting means and ground engageable means for gauging the distance of said cutting means above the ground;
   linkage means for connecting said header to said frame including a pair of laterally spaced lower suspension links and an upper stabilizing link means, said linkage means being pivotally connected at their respective ends to said frame and said header in such a manner as to permit radial flotation of said header relative to said frame;
   a pair of laterally spaced lifting linkages for lifting the respective lower suspension links, each of said linkages including an upper lift arm pivoted on said main frame, a fixed length lift link pivoted on said lift arm and on said respective lower suspension link, a hydraulic cylinder having its body pivotally connected to said frame, and an adapter pivoted to said upper lift arm and having an axially acting lost motion compression coupling with the rod end of said cylinder;
   said hydraulic cylinder in one of said lifting linkages being a master cylinder having an inlet port hydraulically connected to said control valve and said hydraulic cylinder in the other of said lifting linkages being a slave cylinder having an inlet port connected to the outlet port of said master cylinder.

2. The invention according to claim 1 and stop means mounted on said frame in such a position as to limit the upward travel of said upper lift arms such that said lost motion of said coupling is ineffective in the transport position of said header.

* * * * *